(12) United States Patent
Bobsein et al.

(10) Patent No.: US 8,034,869 B2
(45) Date of Patent: Oct. 11, 2011

(54) THICKENED COMPOSITIONS AND METHOD FOR THICKENING AQUEOUS POLYMER COMPOSITIONS

(75) Inventors: Barrett Richard Bobsein, Sellersville, PA (US); Monica A. Luckenbach, Woxall, PA (US); Alvin M. Maurice, Lansdale, PA (US); Ozzie M. Pressley, Cheltenham, PA (US)

(73) Assignee: Rohm and Haas Company, Philadelphia, PA (US)

( * ) Notice: Subject to any disclaimer, the term of this patent is extended or adjusted under 35 U.S.C. 154(b) by 10 days.

(21) Appl. No.: 12/586,265

(22) Filed: Sep. 18, 2009

(65) Prior Publication Data

US 2010/0227953 A1 Sep. 9, 2010

Related U.S. Application Data

(60) Provisional application No. 61/192,513, filed on Sep. 19, 2008.

(51) Int. Cl.
*C08L 29/04* (2006.01)
*C08L 5/00* (2006.01)

(52) U.S. Cl. .......................................... 524/503; 524/27
(58) Field of Classification Search ............... 524/503
See application file for complete search history.

(56) References Cited

U.S. PATENT DOCUMENTS

| 4,155,892 A * | 5/1979 | Emmons et al. ............... 524/507 |
| 2006/0106153 A1* | 5/2006 | Blankenship et al. ........ 524/500 |
| 2007/0021536 A1* | 1/2007 | Pressley et al. ............... 524/115 |
| 2008/0234411 A1 | 9/2008 | Bobsein et al. |

FOREIGN PATENT DOCUMENTS

| EP | 1 582 567 B1 | 10/2005 |
| JP | 2007191686 | 8/2007 |

* cited by examiner

*Primary Examiner* — Ling-Siu Choi
*Assistant Examiner* — Hui Chin
(74) *Attorney, Agent, or Firm* — Andrew Bunn; Cantor Colburn

(57) ABSTRACT

Thickened aqueous compositions, and a method for controlling viscosity drift for thickened aqueous compositions comprising a pigment, a copolymer containing polymerized units of phosphate- or phosphonate-containing monomers, and an acid suppressible thickener.

10 Claims, No Drawings

THICKENED COMPOSITIONS AND METHOD FOR THICKENING AQUEOUS POLYMER COMPOSITIONS

This application claims the benefit of priority under 35 U.S.C. §119(e) of U.S. provisional patent application Ser. No. 61/192,513, filed on Sep. 19, 2008.

BACKGROUND

This invention relates generally to thickened aqueous polymer compositions and methods for thickening aqueous polymer compositions. In particular, this invention describes a method for controlling viscosity drift for thickened aqueous compositions comprising a pigment and a copolymer containing polymerized units of phosphate- or phosphonate-containing monomers, and aqueous compositions made thereby that show minimal viscosity drift.

Aqueous polymer systems, for example aqueous coatings compositions comprising emulsion polymer binders, typically use thickeners to obtain the desired degree of viscosity needed for the proper formulation and application of the aqueous system. One general type of thickener used in aqueous polymer systems is referred to in the art by the term "associative." Associative thickeners are hydrophobically modified so as to provide an aqueous system with certain characteristics such as ease of formulation, pigment settling prevention, film build during application, spatter resistance, low sag, good flow, and leveling. These associative thickeners may have hydrophobic groups attached to or within the water-soluble polymeric backbone. The polymeric backbone may be constructed from one or more blocks of polymerized oxyalkylene units, typically polyethylene oxide or polypropylene oxide. They may also utilize a cellulosic backbone.

Most of the associative thickeners presently on the market are sold as pourable aqueous liquids. For ease of use, it is desirable for the viscosity (Brookfield at 6 rpm) of such thickener products to be less than 15,000 centipoise (cps), or even less than 5,000 cps, so that the product will readily drain from its storage container, and be readily incorporated into the aqueous system to which it is added. The viscosity of the aqueous thickener product can be decreased by reducing the active solids concentration, but this has the drawback of limiting formulation latitude in terms of weight solids of the aqueous system to be thickened by the product.

Many aqueous compositions of polymeric binders comprising polymerized units of phosphate- and phosphonate-containing monomers have proven to be particularly difficult to thicken, since these compositions suffer from a significant viscosity increase (viscosity drift) occurring from a period of hours to a period of weeks after formulating and addition of thickener. This is problematic to commercial formulators and remains as a roadblock on the route to commercialization of such phosphorus containing polymers, the latter being considered desirable for providing improved titanium dioxide utilization efficiency and improved hiding. That is, phosphorus containing binders have been shown to improve the spacing between titanium dioxide pigment particles in the dried coating film.

United States Patent Application Publication No. US 2007/0021536 A1 describes an aqueous composition containing pigment and an acrylic polymer and having reduced flocculation of pigment particles. Table 3 (paragraph 0029) illustrates the problem of viscosity drift for thickened aqueous compositions comprising a pigment and a copolymer containing polymerized units of phosphate- or phosphonate-containing monomers. The problem is alleviated to some extent by the addition of at least one compound containing a pyrophosphate linkage and having no more than 12% carbon. Despite this disclosure, other methods to minimize viscosity drift are desired. Particularly desirable is a thickener that can be used to increase viscosity of these aqueous polymer compositions to a target viscosity (KU), and which resists viscosity drift, thereby eliminating the relatively expensive additive.

A need in the art remains, therefore, for pourable associative thickeners with both low viscosity and the highest active thickener solids possible, which provide thickened systems with minimal viscosity drift for aqueous compositions comprising polymers with phosphorus containing monomers.

STATEMENT OF THE INVENTION

In a first aspect, there is provided an aqueous coating composition, comprising: (a) pigment particles; (b) particles of acrylic polymer or styrene-acrylic polymer comprising polymerized units of monomers containing phosphate or phosphonate groups; and (c) an associative thickener polymer having a backbone comprising a polyoxyalkylene, a polysaccharide, or a polyvinyl alcohol, said associative thickener polymer further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine; wherein the secondary amine, or the tertiary amine, or the tertiary phosphine, or combination thereof, are substantially unprotonated.

For each coating composition of the inventions described herein, there exists a preferred embodiment for which the associative thickener has a substantially non-ionic water soluble backbone. Preferably, the associative thickener has a non-ionic water soluble backbone.

Herein, a water soluble backbone is soluble in water under acidic, neutral and basic conditions, preferably pH=3 to pH=10. Backbones which are insoluble in water under either acidic or basic conditions are not water soluble backbones. The backbone has a solubility in water at 25° C. of at least 10% by weight.

In a second aspect, there is provided an aqueous coating composition, comprising: (a) pigment particles; (b) particles of acrylic polymer or styrene-acrylic polymer comprising polymerized units of monomers containing phosphate or phosphonate groups; and (c) an associative thickener polymer comprising a substantially non-ionic water soluble backbone and a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine; wherein the secondary amine, or the tertiary amine, or the tertiary phosphine, or combination thereof, are substantially unprotonated.

In another aspect, there is provided an aqueous coating composition, comprising: (a) pigment particles; (b) particles of acrylic polymer or styrene-acrylic polymer comprising polymerized units of monomers containing phosphate or phosphonate groups; and (c) an associative thickener polymer comprising a substantially non-ionic water soluble backbone comprising a polyoxyalkylene, a poly(meth)acrylamide, a polysaccharide, or a polyvinyl alcohol, or a copolymer comprising esters of (meth)acrylic acid, said associative thickener polymer further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine; wherein the secondary amine, or the tertiary amine, or the tertiary phosphine, or combination thereof, are substantially unprotonated.

In a another aspect, there is provided a method to increase the viscosity of an aqueous pigmented polymer system, wherein the polymer contains polymerized units of monomers containing phosphate or phosphonate groups, said method comprising: (a) combining the aqueous pigmented polymer system with an aqueous thickener composition, wherein the aqueous thickener composition comprises: (i) 1% to 60% by weight of an associative thickener having a backbone comprising a polyoxyalkylene, a polysaccharide, or a polyvinyl alcohol, said associative thickener further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine; (ii) sufficient acid to substantially protonate the secondary amine, or the tertiary amine, or the tertiary phosphine, or combination thereof; (iii) 40% to 99% by weight of water; and (iv) 0% to 15% by weight of an organic co-solvent, surfactant, cyclodextrin compound, or any combination thereof, as a viscosity-suppressing additive; and (b) adding an amount of a base sufficient to substantially deprotonate the protonated secondary amine, or protonated tertiary amine, or protonated tertiary phosphine, or combination thereof.

For each inventive method to increase the viscosity of an aqueous pigmented polymer system described herein, there exists a preferred embodiment of the method for which the associative thickener has a substantially non-ionic water soluble backbone. Preferably, the associative thickener has a non-ionic water soluble backbone.

In another aspect, there is provided an aqueous coating composition, comprising: (a) pigment particles; (b) particles of acrylic polymer or styrene-acrylic polymer comprising polymerized units of monomers containing phosphate or phosphonate groups; and (c) an associative thickener polymer having a backbone comprising a polysaccharide, a polyvinyl alcohol, a polyvinyl alkyl ether, or a polyvinyl pyrrolidone, said associative thickener polymer further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine; wherein the secondary amine, or the tertiary amine, or the tertiary phosphine, or combination thereof, are substantially unprotonated.

In another aspect, there is provided an aqueous coating composition, comprising: (A) pigment particles; (B) particles of acrylic polymer or styrene-acrylic polymer comprising polymerized units of monomers containing phosphate or phosphonate groups; and (C) an associative thickener polymer having a backbone comprising a polyoxyalkylene segment greater than 10 oxyalkylene units in length and one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing, or wherein the associative thickener is a hydrophobically modified cellulosic polymer; said associative thickener polymer further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine; wherein the secondary amine, or the tertiary amine, or the tertiary phosphine, or combination thereof, are substantially unprotonated.

DETAILED DESCRIPTION

This invention describes a method for controlling viscosity drift for thickened aqueous coating compositions comprising a pigment and polymer particles of a copolymer comprising polymerized units of monomers containing phosphate or phosphonate groups, and aqueous compositions made thereby that show minimal viscosity drift.

In one embodiment, the aqueous polymer system to be thickened is a latex paint composition. A latex paint composition comprises discrete polymer particles dispersed in an aqueous medium along with dispersed pigment and or filler particles. Latex emulsion (co)polymers are an example of latex polymer compositions. In a preferred embodiment, the latex paint comprises an emulsion copolymer that comprises polymerized units of monomers containing phosphate or phosphonate groups and one or more monomers of (meth) acrylates, styrene, vinyl actetate, or other ethylenically unsaturated monomers.

All percentages are weight percentages, unless specified otherwise. Preferably, the copolymer is an acrylic polymer or an acrylic-styrene polymer. Most preferably, the copolymer is an acrylic polymer. The term "acrylic polymer" refers to a polymer comprising at least 40% monomer units derived from among the following acrylic monomers: acrylonitrile (AN); acrylamide (AM), methacrylamide, and their N-substituted derivatives; acrylic acid (AA), methacrylic acid (MAA), and itaconic acid (IA) and their esters. The terms (meth)acrylic and (meth)acrylate refer to acrylic or methacrylic, and acrylate or methacrylate, respectively. Similarly, (meth)acrylamide refers to acrylamide or methacrylamide. Esters of AA and MAA include, but are not limited to, methyl methacrylate (MMA), ethyl methacrylate (EMA), butyl methacrylate (BMA), ethylhexyl methacrylate (EHMA), lauryl methacrylate (LMA), hydroxyethyl methacrylate (HEMA), methyl acrylate (MA), ethyl acrylate (EA), butyl acrylate (BA), ethylhexyl acrylate (EHA) and hydroxyethyl acrylate (HEA), as well as other esters of AA or MAA, e.g., alkyl, hydroxyalkyl and aminoalkyl esters; phosphoalkyl (meth)acrylates. Phosphoalkyl(meth)acrylates include, e.g, phosphoethyl methacrylate (PEM), phosphopropyl(meth) acrylate, phosphobutyl(meth)acrylate. Derivatives of acrylamide include, e.g., methylol acrylamide (MLAM). Acrylic polymers also may contain monomer units derived from other ethylenically unsaturated monomers, e.g., styrene or substituted styrenes; other α,β-unsaturated carboxylic acids, esters and amides; vinyl esters or halides; etc. Preferably, an acrylic polymer contains at least 50% monomer residues derived from acrylic monomers, more preferably at least 60%, and most preferably at least 70%; preferably an acrylic polymer is substantially free of monomer units other than those of AA, MAA and their esters. An "acrylic-styrene copolymer" is a polymer at least 50% of whose monomer units are derived from among AA, MAA, esters of AA and MAA, and styrene monomers. Styrene monomers include styrene (Sty) and substituted styrenes, e.g., α-methylstyrene (AMS). Preferably, acrylic-styrene copolymers contain less than 20% of monomer units other than styrene or acrylic monomer units, more preferably less than 10%, and most preferably less than 5%. Preferably, a polymer in this invention is present in the form of a latex. The polymer may be unimodal or bimodal, see, e.g., U.S. Pat. No. 6,818,697. Latex polymers may be made by emulsion polymerization or by other techniques known in the art. The practice of emulsion polymerization is discussed in detail in D. C. Blackley, *Emulsion Polymerization* (Wiley, 1975). Conventional emulsion polymerization techniques may be used to prepare the polymer composition of this invention as an aqueous dispersion of polymer particles. The practice of emulsion polymerization is also discussed in H. Warson, *The Applications of Synthetic Resin Emulsions*, Chapter 2 (Ernest Benn Ltd., London 1972).

The aqueous composition of this invention comprises an acrylic polymer or styrene-acrylic polymer containing phosphate or phosphonate groups. In one embodiment of the invention, these groups are present in the form of monomer residues from phosphate- or phosphonate-containing monomers, including, e.g., phosphoalkyl(meth)acrylates such as phosphoethyl(meth)acrylate, phosphopropyl(meth)acrylate, and phosphobutyl(meth)acrylate, phosphoalkyl crotonates, phosphoalkyl maleates, phosphoalkyl fumarates, phosphodialkyl(meth)acrylates, phosphodialkyl crotonates, and ally phosphate. For purposes of this invention, phosphoalkyl (meth)acrylates include ethylene oxide condensates of (meth) acrylates such as $H_2C=C(CH_3)COO(CH_2CH_2O)_nP(O)(OH)_2$, where n is from 1 to 50. The phosphate- or phosphonate-containing polymer may be the only acrylic polymer in the composition, or it may be blended with an acrylic polymer not containing phosphate or phosphonate groups. Preferably, the phosphate- or phosphonate-containing monomer units comprise from 0.5% to 8% of the total amount of acrylic polymer(s) on a solids basis, more preferably from 1% to 5%.

In one embodiment of the invention, the acrylic polymer or styrene-acrylic polymer containing phosphate or phosphonate groups has a $T_g$ from −20° C. to 60° C. Preferably, the $T_g$ is from −15° C. to 35° C., and most preferably from 5° C. to 25° C. $T_g$ is calculated using the Fox equation (T. G. Fox, Bull. Am. Physics Soc., vol. 1 (3), page 123 (1956)). Preferably, the $M_w$ of the polymer is at least 10,000, more preferably at least 50,000, and most preferably at least 80,000.

The composition of this invention comprises pigment particles. The composition optionally also contains filler particles. Preferably, the total amount of pigments and fillers as a percentage of total acrylic polymer solids is from 1% to 400%, more preferably from 50% to 200%. Examples of fillers and pigments include, e.g., titanium dioxide, zinc oxide, clay, iron oxide, magnesium silicate, calcium carbonate and combinations thereof. Preferably, the composition of this invention comprises titanium dioxide. Preferably, titanium dioxide particles are orthogonal, i.e., no cross-sectional dimension through a particle is substantially greater than any other cross-sectional dimension through the same particle. Examples of orthogonal particles are spherical and cubic particles, and those having shapes intermediate between spherical and cubic. Preferably, the amount of titanium dioxide as a percentage of total acrylic polymer solids is from 1% to 200%, more preferably from 50% to 150%.

The thickeners of this invention have a molecular structure whereby the same group that is attached to or within the backbone of the associative thickener is reversibly switched between being hydrophilic and hydrophobic in nature. When the group that is attached to or within the backbone is rendered hydrophilic, the aqueous thickener is pourable and readily incorporated into aqueous polymer compositions. When this group is rendered hydrophobic, the thickener performs its thickening function efficiently. Switching is readily accomplished by adjusting the pH of the associative thickener composition and the aqueous polymer composition being thickened. The compositions and methods solve a long-standing need in the art for methods to control the viscosity drift that occurs over a period of hours or days upon thickening of aqueous compositions comprising a pigment and a copolymer containing polymerized units of phosphate- or phosphonate-containing monomers. The aqueous polymer thickener compositions are readily pourable, capable of having a high solids content, and do not adversely affect the properties of the aqueous polymer compositions being thickened or the products formed thereby. Further, since there is no requirement for the addition of volatile organic solvents or costly additives such as cyclodextrin compounds, the compositions and methods are environmentally friendly and cost-effective.

The term "associative thickeners" is known in the art, and refers to thickeners that act via an associative mechanism. The associative mechanism enables the unique set of properties exhibited by the associative thickeners in particular. For example, in latex based coatings, polyether associative thickeners are known to provide improved flow and leveling and better film build compared to high molecular weight, non-associative thickeners.

It is believed in the art that the associative mechanism arises from the structure of associative thickener polymers, which contain distinct hydrophilic and hydrophobic groups. The hydrophilic groups impart overall water solubility to the polymer molecule. The hydrophobic groups associate with other hydrophobic groups on other thickener molecules or on latex particle surfaces to form a dynamic three-dimensional network structure of micelles containing thickener hydrophobic groups. Although the associations in this network are dynamic, interaction lifetimes can be long enough to provide viscosity to the system depending upon the applied shear rate.

As disclosed in U.S. Pat. No. 4,496,708, the "micellar bridging" theory is based upon the existence within the aqueous phase of intermolecular, micelle-like associations between the hydrophobic groups bonded to the water soluble polymer. In the broadest characterization, the term "micelle-like association" is intended to mean the approximate aggregation of at least two hydrophobic groups serving to exclude water. The greater effective lifetime of the micelle-like association yields a stronger network and a higher observed viscosity, that is, greater thickening efficiency. The duration of time that an individual micelle-like association exists is related to the chemical potential of the hydrophobic group as compared to its aqueous environment and steric factors, such as the proximity of one hydrophobic group to another, which aid the approach of two or more hydrophobic groups to each other. The chemical potential of the hydrophobic group as compared to its aqueous environment is directly related to the solubility parameter of the hydrophobic group in water. When the hydrophobic group is less soluble in water, there is a greater driving force for micelle-like association, and thus the network lifetime is greater and the observed viscosity is greater. When the hydrophobic group is more soluble in water, there is a reduced driving force for micelle-like association, and thus the network lifetime is shorter and the observed viscosity is less.

In the thickener compositions described herein, the water solubility parameters of select hydrophobic groups are modulated by controlling the pH of the thickener's aqueous environment. Many aqueous systems of commercial importance are supplied at pH values above about 8. The thickeners described herein deliver better thickening efficiency at pH values above about 8, i.e., the select hydrophobic groups exist in their least water soluble form at pH values above about 8. In the aqueous thickener as supplied at pH values less than about 6 and more than about 2.5, the thickener's efficiency is suppressed because the select hydrophobic groups exist in a more water soluble form. These thickeners are therefore described herein as acid suppressible thickeners. Thus, the novel associative thickener compositions are supplied and added at desirably low viscosities and at practical active solids concentrations. However, these thickeners thicken aqueous systems very effectively if the pH of the aqueous system is adjusted to above about 8.

Most secondary and tertiary amines, as well as some tertiary phosphines, can be protonated at aqueous pH values below about 6. Primary amines, as components of hydrophobic groups, tend to require pH values well above about 8 to deprotonate from their acid form. Thus, primary amines can generally be characterized as too basic to be useful as a component of hydrophobic groups. Nitrogen atoms that are characterized as urea or urethanes tend to not be basic enough. That is, urea and urethane functionalities tend to require a pH value below about 2.5 to exist in the protonated form. At these low pH values, the associative thickener's polyether backbone is more prone to acid catalyzed degradation. Because of degradation during storage, polyether associative thickeners with pH values below about 2.5 are less desirable. These acid suppressible thickeners can be supplied at pH within the range of 2.5 to 6.0, or 2.5 to 5.0, or 3.0 to 4.5.

With regard to adding these thickeners in the low viscosity, high solids form, the following discussion concerning pH and $pK_a$ is applicable to secondary amines, or tertiary amines, or tertiary phosphines. The concentration of the protonated secondary or tertiary amine, that is, the conjugate acid form of the amine, is defined as [HA+]. The concentration of the unprotonated secondary or tertiary amine, that is, the base form of the amine, is defined as [A]. The concentration of protons in solution is defined as [H+]. The acidity constant of the acid form of the amine, $K_a$, can be defined as follows (see, for example, Hendrickson, Cram and Hammond, *Organic Chemistry*, Third Edition, McGraw-Hill, pp 301-302, (1970)).

$$K_a = [H+][A]/[HA+]$$

Furthermore, the $pK_a$ of the secondary or tertiary amine and the pH of the aqueous associative thickener composition can be defined as follows.

$$pK_a = -\log K_a$$

$$pH = -\log [H+]$$

A useful relationship is that when [HA+] equals [A], the pH of the solution will have a value equal to the $pK_a$. Therefore, at pH values less than the amine's $pK_a$, the concentration of the protonated form of the amine will exceed the concentration of the unprotonated form of the amine. The aqueous associative thickener composition must contain sufficient organic or inorganic acid to reduce the pH of the aqueous associative thickener composition below the value of the $pK_a$ of the secondary or tertiary amine functionalities which comprise the thickener's hydrophobic groups thereby substantially protonating said secondary or tertiary amines. When the aqueous associative thickener composition is added to the aqueous system to be thickened, the final pH value of the thickened system should be higher than the $pK_a$ of the secondary or tertiary amine group to substantially deprotonate the protonated hydrophobic amine groups. A method to increase the viscosity of an aqueous polymer composition comprises combining an aqueous polymer system with an aqueous associative thickener composition, said associative thickener further comprising a plurality of hydrophobic groups wherein one or more of said hydrophobic groups comprises a secondary amine, or a tertiary amine, or a tertiary phosphine, or combination thereof, and optionally a quaternary amine, with the proviso that less than 80% of the total amine functionality is a quaternary amine, and where the aqueous associative thickener composition is provided at a pH below that of the $pK_a$ of the secondary amine, or tertiary amine, or tertiary phosphine, or combination thereof; followed by the addition of an amount of base sufficient to raise the pH of the aqueous polymer composition above the $pK_a$ of the secondary amine, or tertiary amine, or tertiary phosphine, or combination thereof, to substantially deprotonate the protonated secondary amine, or protonated tertiary amine, or protonated tertiary phosphine, or combination thereof. The hydrophobic amine or phosphine groups of the associative thickener comprising the thickened aqueous polymer composition are substantially deprotonated when the pH of the thickened aqueous polymer composition exceeds the $pK_a$ of the secondary amine, or tertiary amine, or tertiary phosphine, or combination thereof, of the associative thickener. The alternative "or" expression also encompasses the "and" combination and is used interchangeably.

The $pK_a$ value of the amine or phosphine functionalities in the hydrophobic groups can be experimentally determined by the following method. Disperse 25 gms of thickener solids homogeneously in approximately 975 gms of water and sufficient phosphoric acid to provide 1000 gms of aqueous thickener composition of 2.5% weight thickener solids at pH=4. A mechanical stirrer, a pH meter probe, and a Brookfield viscometer can be simultaneously mounted over the vessel to provide agitation, pH measurement and viscosity measurement of the aqueous composition. Temperature should be 25° C. The stirrer should be turned off while pH measurements and viscosity measurements are recorded. The pH of the aqueous composition is adjusted stepwise upwards with 10% aqueous ammonia until a maximum pH of about 10.5 is obtained. After each aliquot of ammonia is added, the composition is stirred for 5 minutes, and then pH and viscosity are measured. Viscosity in centipoise is measured at 60 rpm and spindle #3, although more viscous titrations may require 60 rpm or lesser speeds with spindle #4 to keep the viscometer readout on scale. The viscosity is plotted on a linear scale versus the pH on a linear scale. At low and high pH values, the viscosity of the aqueous composition is relatively independent of pH. At the intermediate pH values, the viscosity is more dependent upon pH. The viscosity value at the high pH end of titration curve where the viscosity starts to become relatively independent of pH is assigned as the maximum viscosity value. The point on the titration curve corresponding to half of the maximum viscosity value is defined as the midpoint of the titration. The $pK_a$ for the amine or phosphine functionalities comprising the hydrophobic groups of the associative thickener is defined as the pH value associated with the midpoint of the titration.

Aqueous associative thickeners for use in the compositions and methods described herein accordingly comprise a hydrophilic backbone comprising a plurality of hydrophobic groups attached to or within the backbone, wherein at least one of the hydrophobic groups comprises a secondary amine, or a tertiary amine, or a tertiary phosphine, or a combination thereof, and optionally a quaternary amine.

The hydrophilic backbone of the acid suppressible associative thickener can take a variety of forms, for example, the backbone can be linear, branched, or crosslinked. A variety of different types of backbones can be used, for example a polyether such as a polyoxyalkylene, a poly(meth)acrylamide, a polysaccharide, a polyvinyl alcohol, a polyvinyl alkyl ether, or a polyvinyl pyrrolidone. In one embodiment, the hydrophilic backbone comprises a (co)polymer comprising esters of (meth)acrylic acid. Preferably, the backbone is non-ionic. Examples of suitable esters of (meth)acrylic acid include hydroxyethyl(meth)acrylate, that is, HEA or HEMA.

In one embodiment the thickener backbone is a polysaccharide based on a cellulosic backbone, for example a hydroxy ethyl cellulose backbone. Thus, the associative thickener may have a backbone comprising one or more polysaccharide segments greater than 10 saccharide units in length.

In another embodiment, a polyether associative thickener is based on building blocks of polyoxyalkylene segments, for example polyethylene glycol building blocks. For example, the associative thickener may have a backbone comprising one or more polyoxyalkylene segments greater than 10 oxyalkylene units in length. As used herein, the term "oxyalkylene" refers to units having the structure —(O-A)-, wherein O-A represents the monomeric residue of the polymerization reaction product of a $C_{2-8}$ alkylene oxides. Examples of oxyalkylenes include, but are not limited to: oxyethylene with the structure —($OCH_2CH_2$)—; oxypropylene with the structure —($OCH(CH_3)CH_2$)—; and oxybutylene with the general structure —($OC_4H_8$)—. Polymers containing these units are referred to as "polyoxyalkylenes." The polyoxyalkylene units can be homopolymeric or copolymeric. Examples of homopolymers of polyoxyalkylenes include, but are not limited to polyoxyethylene, polyoxypropylene, and polyoxybutylene. Examples of polyoxybutylene include a homopolymer containing units of 1,2-oxybutylene, —($OCH(C_2H_5)CH_2$)—; and polytetrahydrofuran, a homopolymer containing units of 1,4-oxybutylene, —($OCH_2CH_2CH_2CH_2$)—.

Alternatively, the polyoxyalkylene segments of the thickener can be copolymeric, containing two or more different oxyalkylene units. The different oxyalkylene units can be arranged randomly to form a random polyoxyalkylene; or can be arranged in blocks to form a block polyoxyalkylene. Block polyoxyalkylene polymers have two or more neighboring polymer blocks, wherein each of the neighboring polymer blocks contain different oxyalkylene units, and each polymer block contains at least two of the same oxyalkylene units. Oxyethylene is the preferred oxyalkylene segment.

In still another embodiment, thickener polyoxyalkylene segments are linked with non-polyoxyalkylene segments or linkages. When the polyoxyalkylene units are linked with a multi-functional isocyanate, a hydrophobically modified polyurethane polyether associative thickener is generated as is known in the art. These thickeners can also contain urea linkages, ester linkages or ether linkages other than those linking the polyoxyalkylene units. The multi-functional isocyanates can be aliphatic, cycloaliphatic, or aromatic; and can be used singly or in admixture of two or more, including mixtures of isomers. Examples of suitable organic polyisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis (isocyanatocyclohexane), 1,4-cyclohexylene diisocyanate, 1-isocyanato-3-isocyanatomethyl-3,5,5-trimethylcyclohexane, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, 1,5-tetrahydronaphthylene diisocyanate, hexamethylene diisocyanate trimer, hexamethylene diisocyanate biuret, and triphenylmethane-4,4',4''-triisocyanate.

When the thickener polyoxyalkylene segments are linked with a gem-dihalide reagent, hydrophobically modified polyacetal polyether and polyketal polyether associative thickeners are generated. Suitable gem-dihalide reagents include dihalogenomethanes, such as dibromomethane and dichloromethane; 1,1-dichlorotoluene, 1,1-dichloroethane, and 1,1-dibromomethane. When the polyoxyalkylene units are linked with an aminoplast reagent, a hydrophobically modified polyaminoplast polyether associative thickener is generated. When polyoxyalkylene units are linked with an epihalohydrin or trihaloalkane reagent, a hydrophobically modified polyEPI polyether associative thickener is generated, where EPI represents the residue of an epihalohydrin reagent's or a trihaloalkane reagent's reaction with amines, alcohols, or mercaptans. Thus, the associative thickener may have a backbone comprising one or more polyoxyalkylene segments greater than 10 oxyalkylene units in length and one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing.

As stated above, at least one of the hydrophobic groups attached to or within the thickener backbone contains a secondary amine, or a tertiary amine, or a tertiary phosphine, or a combination thereof, and optionally a quaternary amine, that modulates the water solubility of the hydrophobic group, depending on the pH of the aqueous composition containing the thickener.

Herein, a secondary amine is defined as a nitrogen with bonds to only one hydrogen and two carbons, wherein neither of the two adjoining carbons are classified as carbonyls or thionyls. Carbonyls are carbons with a double bond to oxygen. Thus, nitrogen that can be classified as part of amide, urethane or urea groups are not secondary amines. Thionyls are carbons with a double bond to sulfur. The two carbons adjoining the nitrogen radical may have other atoms or groups of atoms, including hydrogen and carbon, bonded to them, with the proviso that at least one of the groups of atoms includes a covalent bond to the thickener backbone. The groups of atoms bonded to the two carbons adjoining the nitrogen radical may connect forming a heterocyclic nitrogen moiety. Optionally, the amine group may be oxidized to the corresponding amine oxide.

Herein, a tertiary amine is defined as a nitrogen with bonds to only two or three carbons wherein the adjoining carbon atoms are not classified as carbonyls or thionyls. Thus, nitrogen that can be classified as part of an amide, urethane or urea group is not a tertiary amine. The two or three carbons adjoining the nitrogen may have other atoms or groups of atoms, including hydrogen and carbon, bonded to them, with the proviso that at least one of the groups of atoms includes a covalent bond to the thickener backbone. The groups of atoms bonded to the two or three carbons adjoining the nitrogen may connect forming a heterocyclic nitrogen moiety. Optionally, the amine group may be oxidized to the corresponding amine oxide.

A quaternary amine is defined as a nitrogen with bonds to four carbons.

Herein a tertiary phosphine is defined as any of several organic compounds having the structure of a tertiary amine as described above, but with phosphorus in place of nitrogen.

The associative mechanism of the associative thickener requires a plurality of (i.e., two or more) hydrophobic groups on each hydrophilic backbone to participate in the network structure responsible for viscosity generation. It has been found that the presence of only a single secondary amine, or tertiary amine, or tertiary phosphine, in the associative thickener is sufficient to decrease the thickening efficiency of the thickener at low pH. However, in one embodiment, at least 2, in another embodiment at least 3, and yet another embodiment at least 5 of the hydrophobic groups which comprise secondary amines, or tertiary amines, or tertiary phosphines are present per thickener molecule. By "attached to or within the backbone" of the thickener, we mean these hydrophobic groups may be located within the backbone, pendant to the backbone and/or on chain termini. The term "hydrophobic group" means a group chosen from radicals and polymeric groups comprising at least one hydrocarbon-based chain chosen from linear and branched, saturated and unsaturated hydrocarbon-based chains, which optionally comprise one or more hetero atom, such as P, O, N and S, and radicals comprising at least one chain chosen from perfluoro and silicone chains. When the term "hydrophobic group" means a group chosen from the hydrocarbon radicals, the hydrophobic group comprises at least 6 carbon atoms, preferably 10-24 carbon atoms.

In the aqueous thickener composition, at least 10%, specifically at least 25%, more specifically at least 50%, and even more specifically at least 80% of the hydrophobic groups have one or more of a secondary amine or a tertiary amine, or a tertiary phosphine functionality.

Examples of reagents that can be used to generate hydrophobic groups comprising at least one secondary amine functionality include N-octylethylenediamine, N-dodecylethylene-diamine, N-octylaminoethanol, N-dodecylaminoethanol, and 2-(2,2,6,6-tetramethyl-4-piperidinyl)ethanol. Alternative routes to generate hydrophobic groups comprising at least one secondary amine functionality include the reaction of primary amines, such as octylamine, decylamine, and iso-tridecylamine, with an alkylhalide, epoxide, or aminoplast reagent.

Examples of reagents that can be used to generate hydrophobic groups comprising at least one tertiary amine functionality include 2-(dibutylamino)ethanol, 2-(dioctylamino) ethanol, 2-(diheptylamino)ethanol, 2-(dihexylamino) ethanol, 2-(diethylhexylamino)ethanol, 2-(dicocoamino) ethanol, 3-dibutylamino propylamine, N-benzyl, N-methyl ethanolamine, 1-(dibutylamino)-2-butanol, 2-amino-5-diethylaminopentane, 1-(bis(3-(dimethylamino)propyl) amino)-2-propanol, N-benzyl 3-hydroxypiperidine, diphenylmethyl piperazine, 1-(1-alkylpiperazine), 1-(1-arylpiperazine), 1-(2-Aminoethyl)-4-benzyl-piperazine, 4-amino-1-benzyl-piperidine, 6-dipropylamino-1-hexanol, 1-dodecylisonipecotamide. Alkoxylated analogs of the dialkylamino ethanol compounds are also suitable reagents. For example, 2-(dihexylamino)ethanol ethoxylated with 1 to 100 units of ethylene oxide are suitable reagents.

In one particularly preferred embodiment, the acid suppressible associative thickener has a backbone comprising one or more polyoxyalkylene segments greater than 10 oxyalkylene units in length and is a hydrophobically modified polyurethane polyether comprising the reaction product of a dialkylamino alkanol with a multi-functional isocyanate, a polyether diol, and optionally a polyether triol. Preferably, the polyether diol has a weight average molecular weight between 2,000 and 12,000, preferably between 6,000 and 10,000.

Thus, a preferred method to increase the viscosity of an aqueous polymer system which includes a pigment and a copolymer with polymerized units of phosphorus-containing monomers comprises: (a) combining the aqueous polymer system with an aqueous thickener composition, wherein the aqueous thickener composition comprises: (i) 1% to 60% by weight of an associative thickener having a backbone comprising one or more polyoxyalkylene segments greater than 10 oxyalkylene units in length, said associative thickener further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine, wherein the associative thickener is a hydrophobically modified polyurethane polyether comprising the reaction product of a dialkylamino alkanol with a multi-functional isocyanate, a polyether diol having a weight average molecular weight between 2,000 and 12,000, preferably between 6,000 and 10,000, and optionally a polyether triol; (ii) sufficient acid to substantially protonate the secondary amine, or the tertiary amine, or the tertiary phosphine, or combination thereof; (iii) 40% to 99% by weight of water; and (iv) 0% to 15% by weight of an organic co-solvent, surfactant, cyclodextrin compound, or any combination thereof, as a viscosity-suppressing additive; and (b) adding an amount of a base sufficient to substantially deprotonate the protonated secondary amine, or protonated tertiary amine, or protonated tertiary phosphine, or combination thereof.

Alternative routes to generate hydrophobic groups comprising at least one tertiary amine functionality include the reaction of secondary amines, such as di-octylamine, di-hexylamine, and di-ethylhexylamine, with an alkylhalide, epoxide, or aminoplast reagent. These reagents would be used to provide hydrophobic groups on the ends of polymer chains. Further examples of reagents that can be used to generate hydrophobic groups comprising at least one tertiary amine functionality include the corresponding amine oxides of the above, for example, 2-(dibutylamino)ethanol N-oxide, 2-(dioctylamino)ethanol N-oxide, and N-benzyl 3-hydroxypiperidine N-oxide.

Examples of reagents that can be used to generate hydrophobic groups comprising at least one tertiary amine functionality where the nitrogen has bonds to two carbons only include pyridine derivatives, such as alkyl- or aryl-substituted hydroxypyridine derivatives, alkyl- or aryl-substituted aminopyridine derivatives, quinoline derivatives, such as hydroxyquinoline, aminoquinoline, 8-ethyl-4-quinolinol, and 6-amino-1,10-phenanthroline, pyrazole and pyrazoline derivatives, such as, 3-amino-5-phenylpyrazole and 5-aminoindazole, imidazole derivatives, such as 2-benzimidazole methanol, 2-butyl-4-hydroxymethylimidazole, and 2-mercapto-1-hexylimidazole, oxazole derivatives, such as, oxazol-2-yl-phenylmethanol, 2-amino-5-ethyl-4-phenyloxazole, 4-(5-methyl-1,3-benzoxazol-2-yl)phenylamine, and imine derivatives, such as alpha-(2-butylimino)-p-cresol, N-(benzylidene)ethanolamine, and 1-((2-hydroxyethyl)iminomethyl)naphthalene. Additional examples of suitable reagents are the corresponding amine oxides of any of the above compounds.

Further examples of reagents that can be used to generate hydrophobic groups comprising at least one tertiary amine functionality include the class of diols with the general formula

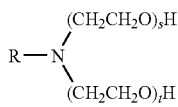

wherein R is a hydrophobic group containing at least 10 carbon atoms and s and t are each at least 1 and the sum (s+t) is from 2 to about 50. The R group can be either linear or branched, saturated or unsaturated and aliphatic or aromatic in nature. Representative diols are available under the name Ethomeen™ from Akzo Nobel Chemicals B.V. (Amersfoort, Netherlands). Illustrative examples include bis(2-hydroxethyl)cocoamine, bis(2-hydroxethyl)cetylamine, bis(2-hydroxethyl)stearylamine, bis(2-hydroxethyl)tallowamine, bis(2-hydroxyethyl)soyaamine, bis(2-hydroxyethyl)isodecyloxypropylamine, bis(2-hydroxyethyl)isotridecyloxypropylamine, bis(2-hydroxyethyl) linear alkyloxypropylamine, and their ethoxylates. Additionally any of the corresponding amine oxides of the above materials can be used. These reagents would be used to provide hydrophobic groups located within and pendant to the polymer chain.

Further examples of reagents that can be used to generate hydrophobic groups comprising at least one secondary and/or tertiary amine functionality include the class of diols prepared via the reaction of primary amines and/or secondary amines with mono- or di-glycidyl ether derivatives or other mono- or di-epoxy derivatives. Examples of suitable epoxy compounds include the mono- or di-glycidyl ethers of various diols, such as ethylene glycol, propylene glycol, polyethylene glycol, polypropylene glycol, 1,4-butanediol, 1,6-hexanediol, bisphenol A, bisphenol F, and cyclohexanedimethanol. Examples of suitable amines include 1-hexylamine, 3-octylamine, 1-isotridecylamine, dibutylamine, dihexylamine, dioctylamine, di-2-ethylhexylamine, benzylamine, diphenylamine, and alkylaniline. For example, the reaction of 2 moles of dioctylamine with 1 mole of poly(ethylene glycol) diglycidyl ether affords the corresponding epoxy-amine adduct, bis[3-(dioctylamino)-2-hydroxypropyl]ether of poly(ethylene glycol). Thus, the associative thickener may have a backbone comprising one or more polyoxyalkylene segments greater than 10 oxyalkylene units in length and is a hydrophobically modified polyurethane polyether comprising the reaction product of an epoxy-amine adduct with a multi-functional isocyanate, and a polyether diol, said epoxy-amine adduct derived from the reaction of primary or secondary amines with mono- or di-glycidyl ether derivatives or other mono- or di-epoxy derivatives. Preferably, the polyether diol has a weight average molecular weight between 2,000 and 12,000, preferably between 6,000 and 10,000.

Further examples of reagents that can be used to generate hydrophobic groups comprising at least one tertiary amine functionality include the reaction products of an N-alkyl trimethylene diamine and an oxyalkylene, such as ethylene oxide, which are available under the name Ethoduomeen™ from Akzo Nobel Chemicals B.V.

Examples of reagents that can be used to generate hydrophobic groups comprising at least one tertiary phosphine functionality include 2-(dialkylphosphino)ethylamines, 3-(dialkylphosphino)propylamines, dialkylhydroxymethylphosphines, dialkylhydroxyethyl-phosphines, bis-(hydroxymethyl)alkylphosphines, bis-(hydroxyethyl)alkylphosphines, and the like. Specific examples include, 2-(diphenylphosphino)ethylamine, 3-(diphenylphosphino)propylamine, 2-(dihexylphosphino)ethylamine, 2-(dioctylphosphino)-ethylamine, bis-(hydroxymethyl)hexylphosphine, bis-(hydroxymethyl)octylphosphine. For example, these reagents can be incorporated into polyurethane based associative thickeners.

Other examples of reagents that can be used to generate hydrophobic groups comprising at least one tertiary phosphine functionality include dialkylphosphines, such as dihexylphosphine, dioctylphosphine, dibenzylphosphine, diphenylphosphine, bis-(dodecyl)phosphine, and the like. For example, these reagents can be incorporated into associative thickener compositions via reaction with epoxy or alkyl halide functionality or via addition to double bonds.

Not all of the hydrophobic groups in the associative thickener are required to comprise secondary amines or tertiary amines or tertiary phosphines. Examples of reagents that can be used to form the hydrophobic groups not comprising secondary amines or tertiary amines or tertiary phosphines include branched or linear aliphatic alcohols, alkylaryl alcohols, aliphatic amines and p-alkylene glycol mono-alkyl ethers. Reagents may be mono-functional or multi-functional. Examples of suitable branched aliphatic alcohols include 2-butyl 1-octanol, 2-butyl 1-decanol, 2-hexyl 1-octanol, 2-hexyl 1-decanol, isononyl alcohol, isodecyl alcohol, and isoundecyl alcohol. Examples of suitable linear aliphatic alcohols include 1-hexadecanol, 1-tetradecanol, 1-dodecanol, 1-undecanol, 1-decanol, 1-nonanol, 1-octanol, 1-hexanol, 1,2-hexadecanediol, and 1,16-hexadecanediol. Examples of suitable alkyl aryl alcohols include nonyl phenol and tri-styryl phenol. Examples of suitable aliphatic amines include 1-decyl amine, 1-octyl amine, 1-hexyl amine, di-octyl amine, di-hexyl amine. Examples of suitable p-alkylene glycol mono-alkyl ethers include alkyl ethoxylates where the alkyl group ranges from 1 carbon to 24 carbons.

Organic or inorganic acids can be used for protonating the amine functionality in the associative thickener. Suitable acids include, for example, phosphoric acid, acetic acid, hydrochloric acid, sulfuric acid, citric acid, carbonic acid, ascorbic acid, glycolic acid, isoscorbic acid, adipic acid, succinic acid, oxalic acid, homopolymers and copolymers of acrylic acid, homopolymers and copolymers of methacrylic acid, homopolymers and copolymers of maleic anhydride, homopolymers and copolymers of styrenesulphonate, homopolymers and copolymers of 2-acrylamido-2-methylpropane sulfonic acid, polyphosphoric acid, homopolymers and copolymers of phosphoethylmethacrylate, alpha hydroxy acids and trans-cinnamic acid. Phosphoric acid and polyacrylic acid with a molecular weight between 1000 and 5000 are preferred.

The thickener and acid are combined to provide an aqueous thickener composition. As used herein, the term "aqueous thickener composition" (or "aqueous thickener polymer composition" or "aqueous associative thickener composition") refers to a composition that is provided predominantly in water rather than organic solvent, although a minor amount of a water-miscible organic solvent can be present. Preferably the aqueous thickener composition comprises less than 5 weight % water miscible solvent, more preferably less than 2 weight % water miscible solvent, and most preferably, less than 1 weight % water miscible solvent, based on the weight of the aqueous thickener composition. In one embodiment, no organic solvent is present in the aqueous thickener composition.

The aqueous thickener composition can further comprise other optional additives useful to decrease the viscosity of the composition. Suitable viscosity suppressing additives include, for example, surfactants such as dialkylsulfosuccinates, sodium lauryl sulfate, alkyl ethoxylates and alkylarylethoxylates; cyclodextrin compounds such as cyclodextrin (which includes α-cyclodextrin, β-cyclodextrin, and γ-cyclodextrin), cyclodextrin derivatives, cycloinulohexose, cycloinuloheptose, cycloinulo-octose, calyxarene, and cavitand. "Cyclodextrin derivatives" refer to α-cyclodextrins, β-cyclodextrins, and γ-cyclodextrins in which at least one hydroxyl group located on the rim of the cyclodextrin ring has been functionalized with a substituent group such as methyl, acetyl, hydroxypropyl, hydroxyethyl group. Preferred cyclodextrin derivatives are methyl-β-cyclodextrin and hydroxypropyl-β-cyclodextrin, in particular methyl-β-cyclodextrin.

In an embodiment for the preparation of the aqueous thickener composition, the associative thickener of the types described above is first dissolved or dispersed in water with no added acid; sufficient acid is then added such that the amount of acid is sufficient to adjust the pH of the aqueous thickener composition to a pH of 2.5 to 6. In another embodiment, the acid or some portion of the total acid is first premixed with water, then the associative thickener polymer is subsequently dissolved or dispersed with stirring or agitation into the acid and water mixture, and if necessary, additional acid is added. Other additives, e.g., water miscible organic solvents or cyclodextrin compounds can be incorporated into the compositions at any point.

In an advantageous feature, the aqueous associative thickener compositions may be pourable at 25° C. The composition can have a viscosity of 500 cps to 15,000 cps, specifically less than 10,000 cps, even more specifically less than 5,000 cps. In a specific embodiment, the thickener compositions are pourable without addition of any organic solvent and/or other viscosity-reducing additive, e.g., a cyclodextrin compound.

In still another advantageous feature, the aqueous associative thickener compositions can be formulated to contain a wide range of solids content. For example, the aqueous associative thickener composition can comprise 1 weight % to 60 weight % thickener solids, specifically 5 weight % to 40 weight % thickener solids, even more specifically 15 weight % to 25 weight % thickener solids, based on the total weight of the aqueous associative thickener compositions. The compositions further comprise 40 weight % to 99 weight % aqueous solution, specifically 60 weight % to 95 weight % aqueous solution, even more specifically 75 weight % to 85 weight % aqueous solution, based on the total weight of the aqueous associative thickener compositions. As stated above, the "aqueous solution" can comprise up to 5 weight percent of a water-miscible organic solvent. The optional additives used to further decrease the viscosity of the composition can be present in an amount of 0 weight % to 15 weight %, specifically 1 weight % to 10 weight %, even more specifically 1 weight % to 3 weight %, based on the total weight of the aqueous associative thickener compositions.

Mixing techniques to incorporate the aqueous associative thickener in the aqueous polymer composition to be thickened include conventional mixing equipment such as mechanical lab stirrers, high speed dispersers, ball mills, sand mills, pebble mills, and paddle mixers. Conventionally, when pigmented, the addition of thickener to the aqueous polymer composition occurs at the end or near the end of formulating, since the practitioner typically formulates to a target KU viscosity and later additions may affect the viscosity. The aqueous associative thickener composition can be incorporated into aqueous polymer compositions in amounts from 0.005 weight % to 20 weight %, preferably from 0.01 weight % to 10 weight %, and most preferably from 0.05 weight % to 5 weight %, based on the weight of the aqueous composition.

Other aqueous polymer systems that may be thickened include pre-blend formulations for paints or coatings; textile formulations; non-woven formulations; leather coatings; paper or paperboard coating formulations; and adhesives.

Optionally, the aqueous polymer compositions may comprise other formulation additives known in the art.

The solids content of the aqueous coating composition of the invention is from 10% to 70% by volume. The viscosity of the aqueous coating composition is from 50 cps to 10,000 cps, as measured using a Brookfield viscometer. There is a wide range of appropriate viscosity depending on the intended use of the aqueous composition.

The composition of this invention provides improved viscosity stability to latex formulations containing pigments and/or fillers, i.e., it reduces the change in viscosity that occurs upon equilibration or aging.

EXAMPLES

The following examples are presented to illustrate the process and the composition of the invention. These examples are intended to aid those skilled in the art in understanding the present invention. The present invention is, however, in no way limited thereby.

The following abbreviations are used in the examples:
HMDI 4,4'-Methylene bis(cyclohexyl isocyanate)
IPDI Isophorone diisocyanate
HDI Hexamethylene diisocyanate
PEG polyethylene glycol
HEUR Hydrophobically modified ethylene oxide urethane polymer
SEC size exclusion chromatography
HPLC high pressure liquid chromatography
Mw weight average molecular weight
Mn number average molecular weight
BA Butyl acrylate
MMA Methyl methacrylate
EA Ethyl acrylate
MAA Methacrylic acid
AAEM Acetoacetoxyethyl methacrylate
"PEM" Phosphoethyl methacrylate (61% active phosphorus containing monomer)

The weight average molecular weights (Mw) of the associative thickeners were determined using size exclusion chromatography (SEC). The separations were carried out at room temperature on a liquid chromatograph consisting of an Agilent 1100 Model isocratic pump and autoinjector (Waldbronn, Germany), and a Polymer Laboratories ELS-1000 Model evaporative light scattering detector (Polymer Laboratories, International, Ltd., Church Stretton, UK). The detector was operated with a 140° C. nebulizer, a 180° C. evaporator, and a 1.5 liter$^2$/minute gas flow rate. System control, data acquisition, and data processing were performed using version 3.0 of Cirrus® software (Polymer Laboratories, Church Stretton, UK). Samples were prepared in N,N-dimethylacetamide (DMAc, HPLC grade) at concentrations of 2 milligram/milliliter (mg/ml), shaken for 6 hours at 80° C., and filtered using 0.45 micron polytetrafluoroethylene (PTFE) filter. The SEC separations were performed in DMAc (HPLC grade) at 0.5 milliliter/minute (ml/min) using a SEC column set comprised of three PLgel™ columns (300×7.5 mm ID) packed with polystyrene-divinylbenzene gel (pore size marked as 100 Å, $10^3$ Å and $10^4$ Å, particle size 5 microns) purchased from Polymer Laboratories (Church Stretton, UK). The injection volume was 100 microliters (ul) of sample solution at a concentration of 2 mg/ml. The molar mass characteristics of the analyzed samples were calculated based on polyethylene glycol/oxide (PEG/PEO) standards also purchased from Polymer Laboratories (Church Stretton, UK).

Thickener Example 1

A mixture of 35.0 g PEG (molecular weight 8000) and 60.0 g toluene was dried by azeotropic distillation. The mixture was cooled to 90° C., and 1.5 g HMDI and 0.1 g dibutyltin dilaurate were added. After 1 hour at 90° C. with stirring, 1.0 g di-n-octylaminoethanol was added. The mixture was then held at 90° C. with stirring for another hour. The resulting solid polymer was isolated after precipitation with hexanes. Mw was measured as 41,000.

Thickener Example 2

A mixture of 216 g PEG (molecular weight 8000) and 22.4 g Ethomeen™ 18/25 was heated to 115° C. under vacuum in a batch melt reactor for 2 hours. Ethomeen™ 18/25 is a bis(2-hydroxyethyl)stearylamine with 25 total units of ethylene oxide. The mixture was cooled to 105° C., and 9.1 g IPDI and 0.5 g bismuth octoate solution (28%) were added. The mixture was then held at 105° C. with stirring for 20 min. The resulting molten polymer was removed from the reactor and cooled. Mw was measured as 21,000.

Thickener Example 3

A mixture of 50.0 g PEG (molecular weight 8000) and 80.0 g toluene was dried by azeotropic distillation. The mixture was cooled to 90° C., and 2.2 g HMDI and 0.1 g dibutyltin dilaurate were added. After 1 hour at 90° C. with stirring, 1.4 g di-2-ethylhexylaminoethanol was added. The mixture was then held at 90° C. with stirring for another hour. The resulting solid polymer was isolated after precipitation with hexanes. Mw was measured as 47,000.

Thickener Example 4

A mixture of 50.0 g PEG (molecular weight 8000) and 100.0 g toluene was dried by azeotropic distillation. The mixture was cooled to 90° C., and 5.0 g HMDI and 0.1 g dibutyltin dilaurate were added. After 1 hour at 90° C. with stirring, 7.7 g di-2-ethylhexylaminoethanol was added. The mixture was then held at 90° C. with stirring for another hour. The resulting solid polymer was isolated after precipitation with hexanes. Mw was measured as 14,000.

Thickener Example 5

A mixture of 50.0 g PEG (molecular weight 8000) and 100.0 g toluene was dried by azeotropic distillation. The mixture was cooled to 90° C., and 5.0 g HMDI and 0.1 g dibutyltin dilaurate were added. After 1 hour at 90° C. with stirring, 3.85 g di-2-ethylhexylaminoethanol and 3.1 g of di-hexylaminoethanol was added. The mixture was then held at 90° C. with stirring for another hour. The resulting solid polymer was isolated after precipitation with hexanes. Mw was measured as 43,000.

Thickener Example 6

A mixture of 50.0 g PEG (molecular weight 8000) and 100.0 g toluene was dried by azeotropic distillation. The mixture was cooled to 90° C., and 5.0 g HMDI and 0.1 g dibutyltin dilaurate were added. After 1 hour at 90° C. with stirring, 6.2 g of di-hexylaminoethanol was added. The mixture was then held at 90° C. with stirring for another hour. The resulting solid polymer was isolated after precipitation with hexanes. Mw was measured as 36,000.

Thickener Example 7

A mixture of 50.0 g PEG (molecular weight 8000) and 100.0 g toluene is dried by azeotropic distillation. The mixture is cooled to 90° C., and 5.0 g HMDI and 0.1 g dibutyltin dilaurate added. After 1 hour at 90° C. with stirring, 6.2 g 2-(diphenylphosphino)ethylamine is added. The mixture is then held at 90° C. with stirring for another hour. The resulting solid polymer is isolated after precipitation with hexanes.

Dispersions of thickener in water were produced by weighing solid dry polymer and water into 50 milliliter (mL) plastic centrifuge tubes. In some cases, glacial acetic acid was also added. The tubes were capped and mounted on a rotator for continuous tumbling over 48 hours. For each example, the highest pH sample was obtained by adding only water and solid dry polymer to the centrifuge tube. The pH value in the samples with added acetic acid varies depending upon how much acetic acid was added. Once homogeneous, the samples were equilibrated in a 25° C. water bath just prior to measuring pH and viscosity on a Brookfield DV-II+ LV viscometer. Aqueous sample pH values were measured on a Corning pH Meter Model 430 (Corning Incorporated, Corning, N.Y., USA). The pH meter was calibrated with pH=7.0 and pH=4.0 buffer solutions from Fisher Scientific (Fair Lawn, N.J., USA).

In the following examples and comparative examples, the objective is to provide the thickener solution at low viscosity so that formulators can add it easily while maintaining a practical active solids concentration. That is, without excessive dilution.

Aqueous Composition Example 1

A 2-(dioctylamino)-ethanol Capped HEUR

The hydrophobic groups in this hydrophobically modified polyurethane polyether associative thickener comprise a tertiary amine functionality. The diisocyanate linker's reaction with the hydroxyl functionality on the 2-(dioctylamino)-ethanol results in a urethane residue. This thickener is an example of the hydrophobic groups comprising tertiary or secondary amine functionality being located at the ends of backbone chains. The tertiary amine functionality is protonated as solution pH is reduced with added acid, in this case acetic acid. As shown in Table 1, aqueous thickener solution viscosity is suppressed at lower pH values.

TABLE 1

| Aqueous Thickener | % Thickener Solids | pH | Viscosity (#4, 60 rpm), cps |
|---|---|---|---|
| Example 1 | 5.0 | 6.22 | 10,400 |
| Example 1 | 5.0 | 5.26 | 300 |
| Example 1 | 5.0 | 4.28 | 13 (#4, 100 rpm) |

Aqueous Composition Example 2

An Internal C18 Ethomeen™ HEUR

The hydrophobic groups in this hydrophobically modified polyurethane polyether associative thickener comprise a tertiary amine functionality. The diisocyanate linker's reaction with the two hydroxyl functionalities on the Ethomeen™ 18/25 results in urethane residues. This thickener is an example of the hydrophobic groups comprising the tertiary or secondary amine functionality being located pendant to the backbone chain. The tertiary amine functionality is protonated as solution pH is reduced with added acid. As shown in Table 2, aqueous thickener solution viscosity is suppressed at lower pH values.

TABLE 2

| Aqueous Thickener | % Thickener Solids | pH | Viscosity (#4, 60 rpm), cps |
|---|---|---|---|
| Example 2 | 11.5 | 7.32 | 9560 |
| Example 2 | 11.5 | 5.91 | 1910 |
| Example 2 | 11.5 | 4.9 | 980 |

Aqueous Composition Examples 3 and 4

2-(diethylhexylamino)-ethanol Capped HEUR

The hydrophobic groups in these hydrophobically modified polyurethane polyether associative thickeners comprise a tertiary amine functionality. The diisocyanate linker's reaction with the hydroxyl functionality on the 2-(diethylhexylamino)-ethanol results in a urethane residue. These thickeners are examples of the hydrophobic groups comprising the tertiary or secondary amine functionality being located at the ends of backbone chains. Samples were made at 20% thickener concentration, with and without added acetic acid. The samples containing either 20% Thickener Example 3 and no added acid or 20% Thickener Example 4 and no added acid were gel-like solids. Thus, the no added acid sample viscosities were too high to reliably measure pH or viscosity. The samples containing acetic acid were low enough in viscosity to measure viscosity and pH reliably. An active thickener concentration of 20% is a typical solids level in commercial pourable aqueous thickener compositions. Data are shown in Table 3.

TABLE 3

| Aqueous Thickener | % Thickener Solids | pH | Viscosity (#4, 60 rpm), cps |
|---|---|---|---|
| Example 3 | 20.0 | 3.5 | 1,950 |
| Example 4 | 20.0 | 3.5 | 1,100 |

Aqueous Composition Example 5

The hydrophobic groups in this hydrophobically modified polyurethane polyether associative thickener comprise two different tertiary amine functionalities. The diisocyanate linker's reaction with the hydroxyl functionality on the 2-(diethylhexylamino)-ethanol and the 2-(dihexylamino)-ethanol results in urethane residues. Samples were made at 20% thickener concentration, with and without added acetic acid. The sample containing 20% Thickener Example 5 and no added acid was a gel-like solid. Thus, the no added acid sample viscosity was too high to reliably measure pH or viscosity. The sample containing acetic acid was low enough in viscosity to measure viscosity and pH reliably. Data are shown in Table 4.

TABLE 4

| Aqueous Thickener | % Thickener Solids | pH | Viscosity (#4, 60 rpm), cps |
|---|---|---|---|
| Example 5 | 20.0 | 3.9 | 1,240 |

Examples of Viscosity Versus pH Titration to Determine $pK_a$ 25 gms of Thickener Example 6 was dissolved in water, with sufficient phosphoric acid addition, to generate a 2.5% weight thickener solids solution at pH=4. Brookfield viscosity (#3 spindle, 60 rpm) was less than 8 cps. Concentrated ammonia was added in stepwise additions and pH and viscosity were measured following 5 minutes stirring. The viscosity versus pH titration curve was generated from the data shown in Table 5. The maximum viscosity value is 172 cps. Therefore, the pKa determined for Thickener Example 6 is 8.7.

TABLE 5

Viscosity of Thickener Example 6 (2.5 weight %)

| pH | Viscosity (cps) |
|---|---|
| 4.0 | 7 |
| 5.0 | 6 |
| 6.0 | 7 |
| 7.0 | 7 |
| 7.43 | 8 |
| 7.65 | 12 |
| 7.85 | 12 |
| 8.07 | 20 |
| 8.21 | 28 |
| 8.38 | 44 |
| 8.53 | 58 |
| 8.69 | 78 |
| 8.81 | 96 |
| 8.90 | 110 |
| 9.00 | 132 |
| 9.18 | 150 |
| 9.28 | 166 |
| 9.38 | 170 |
| 9.48 | 172 |

Evaluated similarly, the Thickener Examples, 3, 5 and 6 had $pK_a$ of 7.4, 8.0, and 8.7, respectively.

Thickener Performance in Paints

The performance obtained by the use of these associative thickeners comprising hydrophobic groups that comprise partially or wholly protonated secondary or tertiary amine functionality was confirmed in a latex paint composition and was comparable to that of commercially available thickeners. The acid suppressible thickeners can be readily used to obtain increased paint viscosity, including viscosities of 80-100 KU, which is typical for commercial paints.

In the experiments below, the problem of viscosity build over a period of hours or a week was addressed for thickened paint formulations containing binders comprising phosphate or phosphonate groups.

Synthesis of Latex Emulsion Polymer 1

The acrylic copolymer dispersion was prepared as follows. A 5-liter, four necked round bottom flask was equipped with paddle stirrer, thermometer, nitrogen inlet and condenser. A mixture of 5.0 grams of Triton™ XN-45S and 907 grams of deionized water was added to the flask and heated to 86° C. under a nitrogen atmosphere. A monomer emulsion (ME) was prepared by mixing 495 grams of deionized water, 28.3 grams of Triton™ XN-45S, 560 grams BA, 750 grams MMA, 600 grams EA, 10 grams MAA, 40 grams AAEM, 40 grams PEM, and 2.5 grams of n-dodecyl mercaptan. With the kettle water at 86° C., the following materials were added in order: a solution of 0.36 grams of 5% 4-hydroxy-TEMPO (4-hydroxy-2,2,6,6-tetramethyl-piperidinyloxy) in 10 grams of deionized water, a solution of 3.2 grams of ammonium bicarbonate in 25 grams of deionized water, 81 grams of ME, and a solution of 4 grams of ammonium persulfate in 25 grams of deionized water. After 10 minutes, a mixture of 19.8 grams of 0.15% iron sulfate solution and 2.9 grams of 1% ethylenediaminetetraacetic acid, tetrasodium salt solution was added. The remaining ME was then added over a period of 120 minutes at 86° C. A cofeed mixture (4 grams of 85% tert-amyl hydroperoxide, 0.6 grams of Triton™ XN-45S, and 144.2 grams of deionized water) and a cofeed solution (3.1 grams of isoascorbic acid in 133 grams of deionized water) were gradually added over a period of 120 minutes. When half of the ME was added to the kettle, 11.0 grams of ammonium hydroxide (28%) was added to the isoascorbic acid cofeed solution. After the completion of the monomer addition, the ME container was rinsed with 50 grams of deionized water. A mixture of 0.5 grams 85% tert-amyl hydroperoxide, 0.02 grams of Triton™ XN-45S, and 8 grams of deionized water was added, followed by a solution of 0.5 grams of isoascorbic acid in 12 grams of deionized water. The dispersion was then cooled to 60° C. While the reaction mixture was allowed to continue to cool, a mixture (0.5 grams 85% tert-amyl hydroperoxide, 0.02 grams of Triton™ XN-45S, and 25 grams of deionized water) and a solution (0.5 grams of isoascorbic acid in 25 grams of deionized water) were then added over 30 minutes. 38.3 grams of a 28% ammonium hydroxide solution was added to the kettle to bring the pH to 9.5-9.7, after which the dispersion was filtered to remove any coagulum. The final dispersion had solids of 51%, average particle size of 110 nm, and pH of 9.6. Triton is a trademark of Dow Chemical Company, Midland, Mich., USA.

Synthesis of Latex Emulsion Polymer 2

The aqueous dispersions were prepared in a 5-liter, four necked round bottom flask equipped with a paddle stirrer, a thermometer, a nitrogen inlet, and a reflux condenser. A mixture of 2 g of Disponil Fes 32 from the Cognis Corporation and 873 g of deionized water were added to the flask and heated to 75° C. under a nitrogen atmosphere. A monomer emulsion (ME) was prepared by mixing 512.6 g of deionized water, 63.1 g of Disponil Fes 32, 976 g BA, 913.6 g MMA, 39 g phosphoethyl methacrylate, and 7.55 g of sodium hydroxide. With the contents of the flask at 75° C., the following materials were added to the kettle: a mixture of 20 g of a solution of 0.1 wt. % iron sulfate in water, 2 g of a solution of 1 wt. % tetrasodium salt of ethylenediaminetetraacetic acid in water, and 227 g of an acrylic latex polymer dispersion (40 nm, 33 wt % solids). The ME was then added to the flask over a period of less than 100 minutes while maintaining the contents of the flask at a temperature of 75° C. A solution of 3.4 g of 70% tert-butyl hydroperoxide (tBHP) in 120 g of deionized water and a solution of 1.86 g of isoascorbic acid in 120 g of deionized water were co-added along with the monomer emulsion addition over the same length of time. After the complete addition of the ME, the ME container was rinsed with 80 g of deionized water. After 15 minutes, a solution of 1.56 g of 70% tBHP in 45 g of deionized water and a solution of 0.72 g of isoascorbic acid in 45 g of deionized water were added over a period of less than 30 minutes and the contents of the flask were allowed to cool to 40° C. Next, a solution of 17.5 g of 28% ammonium hydroxide was added and the contents of the flask were filtered to remove any coagulum. The resulting aqueous polymer dispersion, had a pH of 8.4 and 51.0 wt. % solids. Examination of the dispersion showed that it had an average particle size of 125 nm.

Paint Formulation 1

Paints 1A, 1B and 1C were prepared using Paint Formulation 1 (Table 6) by standard procedures as known in the industry and the pH of the fully formulated paints were in the range of 8.5 to 9.0.

TABLE 6

Paint Formulation 1 (34 PVC; 34% VS)

| Materials | Paint 1A RM-895 Amount (grams) | Paint 1B SCT-275 Amount (grams) | Paint 1C DA-700 Amount (grams) |
|---|---|---|---|
| Grind | | | |
| Titanium Dioxide Slurry 1 (76.5%) | 295.00 | 295.00 | 295.00 |
| Pigment Dispersant | 4.00 | 4.00 | 4.00 |
| Defoamer | 1.00 | 1.00 | 1.00 |
| Nonionic Surfactant (100%) | 1.00 | 1.00 | 1.00 |
| Extender | 25.00 | 25.00 | 25.00 |
| Letdown | | | |
| Latex Emulsion Polymer 1 (51%) | 410.00 | 410.00 | 410.00 |
| Defoamer | 3.00 | 3.00 | 3.00 |
| Glycol | 8.00 | 8.00 | 8.00 |
| Coalescent | 4.00 | 4.00 | 4.00 |
| Water | 150.00 | 150.00 | 150.00 |
| Rheology Modifier, ICI Builder (20%) | 40.00 | 40.00 | 40.00 |
| Opaque Polymer (30%) | 59.00 | 59.00 | 59.00 |
| Rheology Modifier, KU Builder | | | |
| Acrysol 895 (23.5%) | 10.00 | | |
| Acrysol SCT-275 (17.5%) | | 10.00 | |
| Acrysol DA-700 (18.5%) | | | 21.10 |
| Water | 31.55 | 31.55 | 20.45 |
| Totals (equals "1X"): | 1041.54 | 1041.54 | 1041.54 |

Acrysol™ SCT-275 is a HEUR associative thickener rheology modifier; Acrysol™ DA-700 is a HASE associative thickener rheology modifier; Acrysol™ RM-895, unlike the former thickeners, is a hydrophobically modified polyurethane polyether (HEUR) associative thickener rheology modifier wherein the associative thickener polymer has a backbone comprising a polyoxyalkylene, said backbone comprising the reaction product of a dialkylamino alkanol with a multi-functional isocyanate, and a polyether diol having a weight average molecular weight of approximately 8,000, and which backbone further comprises a plurality of hydrophobic groups attached to or within the backbone wherein one or more of said hydrophobic groups comprises an acid suppressible tertiary amine. All three rheology modifiers are products of Rohm and Haas Company (Philadelphia, Pa., USA).

"KU viscosity" is a measure of the mid-shear viscosity as measured by a Krebs viscometer. The Krebs viscometer is a rotating paddle viscometer that is compliant with ASTM-D562. KU viscosity was measured on a Brookfield Krebs Unit Viscometer KU-1+ available from Brookfield Engineering Labs (Middleboro, Mass., USA). "KU" shall mean Krebs unit.

"ICI viscosity" is the viscosity, expressed in units of poise, measured on a high shear rate, cone and plate viscometer known as an ICI viscometer. An ICI viscometer is described in ASTM D4287. It measures the viscosity of a paint at approximately 10,000 sec$^{-1}$. ICI viscosities of paints were measured on a viscometer manufactured by Research Equipment London, Ltd (London, UK). An equivalent ICI viscometer is the Elcometer 2205 manufactured by Elcometer, Incorporated (Rochester Hills, Mich., USA). The ICI viscosity of a paint typically correlates with the amount of drag force experienced during brush application of the paint.

The paints were thickened to a target KU viscosity of approximately 80-90 KU. Upon completion of the formulation and thickener additions, the KU viscosity was noted as the initial KU. Because the paint must satisfy a rheological profile and be useful as paint at some time interval after formulating occurs, it is important that the viscosity be relatively stable. Generally, the severity of the viscosity drift can be assessed by re-measuring KU viscosity 16-20 hours later (i.e. after equilibrating overnight, O/N in Table 7), at which time the thickened paint was stirred for one minute on a lab mixer before measuring viscosity values. The KU build for Paints 1A-C is shown in Table 7.

TABLE 7

| Paint ID | Binder | Builder | Type | gm/1X | KU Initial | KU O/N | Δ |
|---|---|---|---|---|---|---|---|
| Paint 1A (Example) | Polymer 1 | RM-895 | HEUR | 10.00 | 84 | 91 | 7 |
| Paint 1B (Comp.) | Polymer 1 | SCT-275 | HEUR | 10.00 | 81 | 98 | 17 |
| Paint 1C (Comp.) | Polymer 1 | DA-700 | HASE | 21.00 | 79 | 90 | 11 |

Paint formulators generally strive for a viscosity build (ΔKU) of less than 8 KU and preferably less than 5 KU. In this respect, latex paints with aqueous emulsion polymers comprising monomers with phosphate or phosphonate groups are particularly challenging. It can be seen that Paint 1A, in accordance with the claimed invention, has an acceptable viscosity build and shows significant improvement over Paints 1B and 1C, which differ only in the KU builder rheology modifier.

Paints 2A, 2B, and 2C produced from the formulation in Table 8 (below) comprise a different latex emulsion polymer (Polymer 2) and a different paint formulation.

TABLE 8

Paint Formulation 2 (30 PVC, 32% VS)

| Materials | Paint 2A RM-895 Amount (grams) | Paint 2B SCT-275 Amount (grams) | Paint 2C RM-8W Amount (grams) |
|---|---|---|---|
| Grind | | | |
| Titanium Dioxide Slurry 2 (76.5%) | 300.00 | 300.00 | 300.00 |
| Pigment Dispersant | 6.00 | 6.00 | 6.00 |
| Defoamer | 1.00 | 1.00 | 1.00 |
| Nonionic Surfactant (100%) | 1.00 | 1.00 | 1.00 |
| Extender | 25.00 | 25.00 | 25.00 |
| Letdown | | | |
| Latex Emulsion Polymer 2 (51%) | 413.34 | 413.34 | 413.34 |
| Defoamer | 3.00 | 3.00 | 3.00 |
| Glycol | 8.00 | 8.00 | 8.00 |
| Coalescent | 4.38 | 4.38 | 4.38 |
| Water | 121.40 | 121.40 | 121.40 |
| Rheology Modifier, ICI Builder (20%) | 30.00 | 30.00 | 30.00 |
| Opaque Polymer (30%) | 26.30 | 26.30 | 26.30 |
| Rheology Modifier, KU Builder | | | |
| Acrysol 895 (23.5%) | 20.00 | | |
| Acrysol SCT-275 (17.5%) | | 4.50 | |
| Acrysol RM-8W (21.5%) | | | 4.00 |
| Water | 90.00 | 105.50 | 106.00 |
| Totals (equals "1X"): | 1049.42 | 1049.42 | 1049.42 |

Acrysol ™ RM-8W is a HEUR associative thickener rheology modifier available from the Rohm and Haas Company (Philadelphia, PA, USA).
Acrysol ™ RM-895 and Acrysol ™ SCT-275: as described in Table 9.

The initial KU, overnight KU, and KU after 2 weeks were measured, and the data presented in Table 9, below, along with the KU build compared to the initial measurement, or ΔKU.

TABLE 9

| Paint ID | Binder | Builder | Type | gm/1X | KU Initial | KU O/N | KU 2 Wk | ΔAKU O/N | ΔAKU 2 Wk |
|---|---|---|---|---|---|---|---|---|---|
| Paint 2A | Polymer 2 | RM-895 | HEUR | 20.00 | 88 | 88 | 88 | 0 | 0 |
| Paint 2B | Polymer 2 | SCT-275 | HEUR | 4.50 | 94 | 103 | 112 | 9 | 18 |
| Paint 2C | Polymer 2 | RM-8W | HEUR | 4.00 | 90 | 95 | 100 | 5 | 10 |

The Comparative Paints, 2B and 2C, vary from Paint 2A only in the KU builder rheology modifier. Both of the Comparative Paints show an unacceptable viscosity build. On the other hand, Paint 2A, in accordance with the invention, is stable with respect to viscosity drift, showing a ΔKU of zero both overnight and after 2 week.

The singular forms "a," "an," and "the" include plural referents unless the context clearly dictates otherwise. Unless defined otherwise, technical and scientific terms used herein have the same meaning as is commonly understood by one skilled in the art. The endpoints of all ranges directed to the same component or property are inclusive of the endpoint and independently combinable. As used herein, the term "(meth) acrylic" encompasses both acrylic and methacrylic. Similarly, the term "poly(meth)acrylamide" encompasses both polyacrylamide and polymethacrylamide.

As described earlier herein, the associative thickener of this invention preferably has a non-ionic water soluble backbone. The addition of minor amounts of ionic groups in the backbone of the inventive associative thickener is also contemplated. Minor amounts of ionic groups are less than 20 weight percent, and more preferably less than 5 weight percent, of ionic monomer units based on the total weight of backbone monomer units. Thus, the associative thickener of this invention may have a substantially non-ionic water soluble backbone and still be considered a non-ionic water soluble backbone.

All cited documents are incorporated herein by reference.

What is claimed is:

1. An aqueous coating composition, comprising:
   (a) pigment particles;
   (b) particles of acrylic polymer or styrene-acrylic polymer comprising polymerized units of monomers containing phosphate or phosphonate groups; and
   (c) an associative thickener polymer having a backbone comprising a polyoxyalkylene, a polysaccharide, or a polyvinyl alcohol, said associative thickener polymer further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine; wherein the secondary amine, or the tertiary amine, or the tertiary phosphine, or combination thereof, are substantially unprotonated.

2. The composition of claim 1, wherein the associative thickener polymer has a backbone comprising one or more polyoxyalkylene segments greater than 10 oxyalkylene units in length.

3. The composition of claim 1, wherein the associative thickener polymer has a backbone comprising one or more polysaccharide segments greater than 10 saccharide units in length.

4. The composition of claim 2, wherein the backbone of the associative thickener polymer further comprises one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing.

5. The composition of claim 2, wherein the associative thickener polymer is a hydrophobically modified polyurethane polyether comprising the reaction product of a dialkylamino alkanol with a multi-functional isocyanate, a polyether diol having a weight average molecular weight between 2,000 and 12,000, and optionally a polyether triol.

6. The composition of claim 2, wherein the associative thickener polymer is a hydrophobically modified polyurethane polyether comprising the reaction product of an epoxyamine adduct with a multi-functional isocyanate, and a polyether diol having a weight average molecular weight between 2,000 and 12,000, said epoxy-amine adduct derived from the reaction of primary or secondary amines with mono- or diglycidyl ether derivatives or other mono- or di-epoxy derivatives.

7. An aqueous coating composition, comprising:
   (a) pigment particles;
   (b) particles of acrylic polymer or styrene-acrylic polymer comprising polymerized units of monomers containing phosphate or phosphonate groups; and
   (c) an associative thickener polymer comprising a substantially non-ionic water soluble backbone and a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine; wherein the secondary amine, or the tertiary amine, or the tertiary phosphine, or combination thereof, are substantially unprotonated.

8. The aqueous coating composition of claim 7, wherein the substantially non-ionic water soluble backbone of the associative thickener polymer further comprises a polyoxyalkylene, or a poly(meth)acrylamide, or a polysaccharide, or a polyvinyl alcohol, or a copolymer comprising esters of (meth)acrylic acid.

9. A method to increase the viscosity of an aqueous pigmented polymer system, wherein the polymer contains polymerized units of monomers containing phosphate or phosphonate groups, said method comprising:
   (a) combining the aqueous pigmented polymer system with an aqueous thickener composition, wherein the aqueous thickener composition comprises:
      (i) 1% to 60% by weight of an associative thickener having a backbone comprising a polyoxyalkylene, a polysaccharide, or a polyvinyl alcohol, said associative thickener further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine;
      (ii) sufficient acid to substantially protonate the secondary amine, or the tertiary amine, or the tertiary phosphine, or combination thereof;
      (iii) 40% to 99% by weight of water; and
      (iv) 0% to 15% by weight of an organic co-solvent, surfactant, cyclodextrin compound, or any combination thereof, as a viscosity-suppressing additive; and
   (b) adding an amount of a base sufficient to substantially deprotonate the protonated secondary amine, or protonated tertiary amine, or protonated tertiary phosphine, or combination thereof.

10. An aqueous coating composition, comprising:
    (A) pigment particles;
    (B) particles of acrylic polymer or styrene-acrylic polymer comprising polymerized units of monomers containing phosphate or phosphonate groups; and
    (C) an associative thickener polymer having a backbone comprising a polyoxyalkylene segment greater than 10 oxyalkylene units in length and one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing, or wherein the associative thickener is a hydrophobically modified cellulosic polymer; said associative thickener polymer further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine;

wherein the secondary amine, or the tertiary amine, or the tertiary phosphine, or combination thereof, are substantially unprotonated.

* * * * *